United States Patent Office 3,437,668
Patented Apr. 8, 1969

3,437,668
PRODUCTION OF HALO-SUBSTITUTED CAPROLACTONES
Karl-Heinz Koenig and Horst Pommer, Ludwigshafen (Rhine), Germany, assignors to Badische Anilin- & Soda-Fabrik Aktiengesellschaft, Ludwigshafen (Rhine), Germany
No Drawing. Filed Mar. 15, 1966, Ser. No. 541,438
Claims priority, application Germany, Mar. 20, 1965, B 81,089
Int. Cl. C07d 9/00
U.S. Cl. 260—343                6 Claims

ABSTRACT OF THE DISCLOSURE

Production of ε-caprolactones monosubstituted in 3 or 4 position (a) by heating a 3,6-dihalocaproic acid and/or a 4,6-dihalocaproic acid, alone, possibly in the presence of an inert solvent, but in the absence of water to a temperature of from 120° to 280° C. or (b) by treating a 3,6-dihalocaproic acid and/or a 4,6-dihalocaproic acid with an aqueous acid at a temperature of from −10° to +120° C. or with an aqueous alkali at −10° to +50° C., then adjusting the pH value of the reaction mixture to 1 to 4, if necessary with addition of water, and heating the product at least a short time at this pH value at 70° to 150° C., if the reaction has not already been carried out in this pH range and in the said temperature range. The halo caprolactones produced by the process can be used as intermediates to form amino lactones, amino lactams, or hydroxy amino acids. The halo caprolactones can also be polymerized to form solid polyesters. The polyesters can be used as lacquer materials or can be processed to form films or filaments.

This invention relates to halo-substituted caprolactones and to a process for their production.

It is known that the lactone of 4-hydroxyhexene-(2)-acid is obtained by heating 3,4-dibromohexanoic acid in the present of water and the lactone of 5-hydroxyhexene-(2)-acid from 3,5-dibromohexanoic acid in an analogous way. It is also known that 2-bromo-4-hydroxybutyrolactone is formed by heating 2,4-dibromobutyric acid. In these cases six- or five-membered ring lactones are known to form with great ease. Finally it is known that epsilon-caprolactone can only be prepared in low yields by dry heating silver or alkali metal salts of epsilonhalohexanoic acids, whereas monomeric and polymeric epsilon-hydroxyhexanoic acids are formed by the action of an aqueous alkaline solution on epsilon-halohexanoic acids. A seven-membered ring lactone obviously forms much less easily.

It is an object of the invention to provide lactones of 6-hydroxycaproic acid bearing halogen as substituents in 3- or 4-position, and methods of producing these compounds. Another object of the invention is to provide a method for separating 6-halocaproic acids from 3- or 4-halosubstituted 6-hydroxyhexanolactones.

We have found that 6-hydroxycaprolactones which are monohalosubstituted in 3- or 4-position are obtained by heating a 3,6-dihalohexanoic acid and/or a 4,6-dihalohexanoic acid alone, in the presence or absence of an inert solvent and in the absence of water, to a temperature of from 120° to 280° C. or treating it with an aqueous acid at −10° to 120° C. or with an aqueous alkali at −10° to −50° C., then adjusting the pH value of the reaction mixture to 1 to 4, with or without the addition of water, and heating the product for at least a short time at this pH value at 70° to 150° C. if the reaction has not already been carried out in this pH range and in the said temperature range.

It is surprising that seven-membered ring lactones (which otherwise do not form so easily) are formed by the new process. Separation of 6-halohexanoic acid from the said dihalohexanoic acid may even be carried out by the new process because 6-halohexanoic acid remains substantially unchanged under the reactions conditions.

Methods are already known for the production of the dihalohexanoic acids used as starting materials. For example 3,6-dibromocaproic acid is obtained by heating tetrahydrofuryl-(2)-acetic acid with 48% hydrobromic acid under pressure or from 6-phenoxy-hexene-(2)-acid with aqueous hydrobromic acid. The dihalohexanoic acids may also be obtained by chlorination of 6-chlorohexanoic or 6-bromohexanoic acid under the action of daylight or ultraviolet light. The mixture of isomers thus obtained consists mainly of 4,6-dihalohexanoic acids with a large proportion of 3,6-dihalohexanoic acids. The corresponding iodo- or fluoro-substituted hexanoic acids are accessible from the chloro- or bromo-hexanoic acids by the conventional methods for exchanging chlorine or bromine atoms by iodine or fluorine atoms. It is however preferred to use 4,6- or 3,6-dichloro-, -dibromo-, -chlorobromo- or -bromochloro-hexanoic acid. For example the following may be used: 4,6-dichlorohexanoic acid, 3,6-dichlorohexanoic acid, 4,6 dibromohexanoic acid, 3,6-dibromohexanoic acid, 4-bromo-6-chlorohexanoic acid, 4-chloro-6-bromohexanoic acid, 6-iodo-4-chlorohexanoic acid, 6-iodo-3-chlorohexanoic acid, 6-fluoro-4-chlorohexanoic acid and 6-fluoro-3-chlorohexanoic acid. Mixtures such as are obtained by bromination or particularly by chlorination of 6-halohexanoic acids under the action of light and which also contain 4,6- and 3,6-dihalohexanoic acids and small amounts of other halohexanoic acids may also be used. When hexanoic acids bearing iodine as a substituent in 6-position are used, they are advantageously formed intermediately from the chlorine or bromine compounds, for example by adding alkali metal iodides to them.

The halo-substituted 6-hydroxycaprolactones are formed by heating the starting materials to 120° to 280° C., particularly 150° to 210° C. It is advantageous to carry out the heating at subatmospheric pressure, for example at 0.5 to 100 mm. Hg. Heating of the starting materials may also be carried out in an inert organic solvent, preferably in one whose boiling point lies in the said temperature range. Examples of suitable inert organic solvents are aromatic hydrocarbons, such as xylenes, ethylbenzene, naphthalene, halosubstituted aromatic hydrocarbons, such as chlorobenzene, and also tetrahydronaphthalene, decahydronaphthalene and aromatic ethers, such as diphenyl ether. After having been heated, the reaction product is allowed to cool, for example to a temperature below 60° C., and a pH value of 6 to 9 is set up by adding aqueous alkali with continuous mixing. As the aqueous alkali it is preferred to use 1 to 25% by weight caustic soda solution or 1 to 20% by weight caustic potash or calciumhydroxide solution. To isolate the halolactones thus prepared, the organic layer may for example be separated and the aqueous alkaline solution adjusted to a pH value of 1 to 4 particularly 1 to 3, by adding an acid reagent, heated for some time, for example an hour, at 70 to 150° C., particularly 80° to 100° C., adjusted to a pH value of 4.5 to 7, particularly 5.5 to 6.5, with potassium carbonate solution and then extracted with a solvent for the lactone formed, for example with aromatic hydrocarbons, such as benzene, toluene, or halohydrocarbons, such as chloroform, trichloroethylene, methylene chloride, or ethers, for example diethyl ether, dibutyl ether, diisopropyl ether or diisoamyl ether, the solvent removed and the halolactone then distilled.

It is preferred however to carry out the reaction of the 3,6- or 4,6- dihalohexanoic acids with water. If the reaction of the dihalohexanoic acids be carried out in aqueous medium, to which acids or bases may be added, simple mixing of the dihalohexanoic acids with water or with the aqueous solution of an acid or base at room temperature, or even lower, for example −10° C., is sufficient. A temperature of about +50° C. should not be exceeded in alkaline medium, while in acid medium the process may be carried out at temperatures up to about 120° C. When the reaction is carried out in an acid aqueous medium, it is preferred to use for acidification non-oxidizing inorganic acids, such as hydrohalic acids, sulfuric acid, phosphoric acid, or low molecular weight fatty acids, such as formic acid, acetic acid or propionic acid. Acid salts, for example potassium bisulfate or sodium dihydrogen phosphate, may also be added. The acids or acid salts are added in such amounts that in aqueous phase a maximum pH value of 1.0 is achieved.

The embodiment of the invention in which water is merely mixed with the dihalocarboxylic acid without adding acid or base is preferred.

If 3,6- or 4,6-dihalohexanoic acids be reacted only with water, the aqueous phase slowly becomes strongly acid by elimination of hydrogen halide. It is therefore advantageous in this case to use a large excess of water or to neutralize the hydrogen halide formed during the reaction by adding alkali during the reaction so that the pH value of the aqueous phase does not fall below 1.

If the reaction be carried out in an alkaline medium, it is preferred to use additions of oxides, hydroxides, carbonates or alcoholates of alkali metals or alkaline earth metals, for example sodium methylate or sodium ethylate, or ammonia, hydrazine, hydroxylamine or organic bases, such as primary, secondary or tertiary aliphatic or aromatic amines, for example alkylamines, dialkylamines, trialkylamines, cycloalkylamines, N - monoalkyl - substituted and N,N-dialkyl-substituted cycloalkylamines, arylamines, and N-monoalkyl-substituted and N,N-dialkyl-substituted arylamines, those being preferred whose alkyl radicals contain one to fifteen carbon atoms, whose cycloalkyl radicals contain five to twelve carbon atoms and whose aryl radicals are benzene radicals. Examples are: methylamine, diethylamine, triethylamine, 2-ethylhexylamine, laurylamine, N,N,-dimethylcyclohexylamine, aniline and dimethylaniline. Pyridine bases, such as pyridine, picoline, quinoline and quinaldine are also suitable. Alkanolamines, particularly those having two to four carbon atoms in each alkanol radical, for example ethanolamine, diethanolamine, triethanolamine, monoisopropanolamine, diisopropanolamine and triisopropanolamine, are very suitable bases.

The bases are usually used in amounts of up to 10, preferably 0 to 2.5 moles, per mole of dihalohexanoic acid. A large excess of base over the amount required for combining with 1 mole of hydrogen halide per mole of dihalohexanoic acid is neither necessary nor advantageous because secondary reactions may then occur.

The reaction period depends on the conditions chosen, and the most favorable period may be ascertained most simply by preliminary experiment.

If the process be carried out in aqueous medium, the dihalohexanoic acid used as starting material may be added to the aqueous phase or conversely the aqueous phase may be added to the dihalohexanoic acid. The relative proportions of dihalohexanoic acid and water may be within wide limits, for example up to 150 moles of water may be used per mole of dihalohexanoic acid; preferably 10 to 65 moles of water is used per mole of dihalohexanoic acid.

The process may also be carried out by adding to the reaction mixture an alkali metal halide or alkaline earth metal halide which is derived from a halogen having a higher atomic weight than the halogen in 6-position in the dihalohexanoic acid, for example by adding an iodide to a 6-chloro-4-halohexanoic acid or a 6-bromo-4-halohexanoic acid. It is not necessary to add a stoichiometric amount of alkali halide because the halogen is always available again in the course of the reaction. In this way a dihalohexanoic acid is intermediately formed which has in 6-position a more reactive halogen atom than the dihalohexanoic acid originally used. The process may then as a rule be carried out under milder conditions than when using dihalohexanoic acids which contain in 6-position a halogen atom which has a low atomic weight.

After the reaction mixture has been heated or has been treated with an aqueous medium, it may if necessary be cooled, for example to a temperature below 60° C. and water may if necessary be added, and then adjusted to a pH value of 1 to 4 and brought to a temperature of 70° to 150° C. When starting from an alkaline solution, the reaction mixture is adjusted to the pH value of 1 to 4 preferably by adding non-oxidizing and non-reducing acid reagents; when starting from acid solutions, only a trivial correction of the pH value is usually necessary, usually by adding a small amount of a base (as already enumerated above for neutralization). When the acid solution is heated, the presence of water is not necessary, but it is advantageous to carry out the heating in the presence of water, for example up to 150 moles of water per mole of dihalohexanoic acid. The reaction mixture is usually left for ten to three hundred minutes, preferably from thirty to one hundred minutes, in the acid aqueous phase in the said temperature range.

The reaction mixture thus obtained is further worked up by methods conventionally used for separating lactones, for example the pH value may be adjusted to 4.5 to 7, particularly 5.5 to 6.5 and the lactone extracted with one of the above mentioned organic water-immiscible solvents, thus separated from unreacted starting material and then recovered from the extract by distillation.

The process also permits separation of a mixture of 6-halohexanoic acid and 3,6- and/or 4,6-dihalohexanoic acid into 6-halohexanoic acid and halocaprolactone. In the process of extracting the lactone, the 6-halohexanoic acid remains as a salt in the aqueous phase. The free acid is obtained by acidifying to pH 1 to 4.5 the aqueous phase freed from lactone by extraction. The 6-halohexanoic acid may be reconverted into 2,6-dihalohexanoic acid and lactonized again.

Halocaprolactones obtainable by the process are valuable intermediates, for example for the production of aminolactones, aminolactams or hydroxyaminoacids. They may also be polymerized to solid polyesters in a manner analogous to that for non-halo-substituted caprolactones. These polyesters may be used as lacquer raw materials, but may also be processed into films or filaments or as components in polymeric compositions.

The invention is further illustrated in the following examples in which as a rule mixtures of 3,6- and 4,6-dihalohexanoic acid are used such as are obtained by chlorination or bromination of 6-halohexanoic acids. These mixtures, in addition to 4,6- and 3,6-dihalohexanoic acids (which form the main constituents), contain small amounts of other dihalohexanoic acids. Wherein the examples reference is made to 3,6-dihalohexanoic acids or 4,6-dihalohexanoic acids alone, these are obtained by fractional distillation of the acids or their methyl or ethyl esters from the said mixtures. In these cases small amounts of isomeric dihalohexanoic acids may be contained in the starting material.

Example 1

93 parts by weight of a mixture of 3,6- and 4,6-dichlorohexanoic acids (containing about 30% of 3,6-dichlorohexanoic acid) and 60 parts of water are heated for four hours at 100° to 130° C. in a closed vessel while being well mixed. The reaction mixture is cooled and the aqueous layer is separated. The organic layer is adjusted to pH 6 to 7 with 0.5 N caustic potash solution and shaken with chloroform. The solvent is distilled off and the residue fractionated under subatmospheric pressure. The main fraction obtained at a boiling point of 93° to 96° C. at 0.3 mm. Hg is 56 parts by weight of a mixture of 3- and 4-chloro-6-hydroxyhexanolactone $$(n_D^{22}=1.4725)$$

equivalent to 76% of the theory.

Example 2

138 parts by weight of a mixture of 3,6- and 4,6-dibromohexanoic acid (containing about 10% of 3,6-dibromohexanoic acid) is heated under reflux with 350 parts by weight of water for six hours. The aqueous layer is separated and discarded; the oily organic layer is taken up in 30 parts of methylene chloride and adjusted to pH 6 to 6.5 by slow addition of 1 N potassium carbonate solution. The methylene chloride layer is dried, freed from solvent under subatmospheric pressure and then fractionally distilled. 84 parts by weight of a fraction having a boiling point of 105° to 109° C. at 0.5 mm. Hg is obtained. It is 4-bromo-6-hydroxyhexanolactone with a little 3-bromo-6-hydroxyhexanolactone. The yield is equivalent to 87% of the theory.

Example 3

600 parts of a 20% caustic soda solution is slowly added with slight cooling to 185 parts of a mixture of 3,6- and 4,6-dichlorohexanoic acid. The mixture is stirred for fifteen hours at room temperature, then adjusted to a pH value of 6 to 6.5 by adding 2 N sulfuric acid, heated for fifty minutes at 90° C., the solution is saturated by adding ammonium sulfate and the saturated solution is shaken twice with ether. The solvent is distilled off and the residue is fractionally distilled under subatmospheric pressure. 105 parts by weight of a mixture of 3- and 4-chloro-6-hydroxyhexanolactone is obtained having a boiling point of 89° to 93.5° C. at 0.2 mm. Hg and a refractive index $n_D=1.4750$. The yield is equivalent to 71% of the theory.

Example 4

140 parts by weight of concentrated aqueous ammonia is slowly added to 93 parts by weight of a mixture of 3,6- and 4,6-dichlorohexanoic acid at 25° to 30° C. The mixture is stirred for four hours, the pH value of the solution is adjusted with 2 N hydrochlororic acid to 6.5 to 7, the aqueous solution extracted three times with chloroform at 80° to 100° C. for two hours, the solvent distilled off and the residue fractionally distilled at subatmospheric pressure. 46 parts by weight of a mixture of 3- and 4-chloro-6-hydroxyhexanolactone having a boiling point of 93° to 97° C. at 0.4 mm. Hg and $n_D=1.4748$ is obtained. The yield is equivalent to 62% of the theory.

Example 5

120 parts by weight of a mixture of 3-chloro-6-bromohexanoic acid and 4-chloro-6-bromohexanoic acid is heated with a solution of 6 parts by weight of potassium iodide in 150 parts by weight of water for five hours under reflux. The reaction mixture is worked up as described in Example 2 and 60 parts by weight of a mixture of 3- and 4-chloro-6-hydroxyhexanolactone is obtained, equivalent to 80.5% of the theory.

Example 6

185 parts by weight of 4,6-dichlorohexanoic acid is heated to 150° to 220° C. at a pressure of 10 to 30 mm. Hg and kept at this temperature for six hours. The reaction mixture is then cooled and the pH value is adjusted to 6.5 to 7 with aqueous potassium carbonate solution. The solution is shaken several times with benzene, the benzene is distilled off from the benzene extract and the residue is fractionated under subatmospheric pressure, 85 parts by weight of 4-chloro-6-hydroxyhexanolactone is obtained, equivalent to 58% of the theory.

Example 7

A mixture of 1 mole of 6-chlorohexanoic acid (151 parts) and 1 mole of 4,6-dichlorohexanoic acid (185 parts) is stirred with 1.2 kg. of water for ten hours at 30° to 40° C., the aqueous phase is separated and the organic phase is heated for one hour with the addition of a little hydrochloric acid at pH 1. The resultant solution is extracted at pH 6 with methylene chloride and distilled; the yield is 115 parts (equivalent to 78% of the theory) of 4-chloro-6-hydroxyhexanolactone. The aqueous phase adjusted to pH 6 is brought to pH 1 and the precipitated 6-chlorohexanoic acid (138 parts) is recovered.

We claim:

1. A process for the production of 6-hydroxyhexanolactones (6-hydroxycaprolactones) having a single halogen atom in one of the positions 3 and 4 by treating at −10 to +120° C. 3,6-dihalohexanoic acid, 4,6-dihalohexanoic acid or mixtures thereof with water or an aqueous acid selected from the group consisting of hydrohalic acids, sulfuric acid, phosphoric acid, low molecular weight fatty acids, potassium bisulfate and sodium dihydrogen phosphate, adjusting the pH value of the mixture to 1 to 4 and heating the acid mixture to a temperature of from 70 to 150° C. if the reaction has not already been carried out within this pH-range in the said temperature range, and isolating the halolactone.

2. A process as claimed in claim 1 in which water is added to the reaction mixture at a temperature below 100° C., the pH-value of the aqueous mixture is adjusted to 6 to 9, the organic layer is separated, the pH-value of the aqueous solution is adjusted to 1 to 4, the acid mixture is heated to 70 to 150° C., the pH-value of the mixture is adjusted to 4.5 to 7, the lactone formed is extracted by a solvent for the lactone and the lactone is isolated from the solution obtained.

3. A process for the separation of a mixture containing a 6-monohalohexanoic acid in addition to a 4,6- or 3,6-dihalohexanoic acid or mixtures thereof by using a process as claimed in claim 1, extracting the lactone with an inert solvent for the lactone and recovering the 6-halocaproic acid from the aqueous solution.

4. A process for the separation of a mixture containing a 6-monohalohexanoic acid in addition to a 4,6- or 3,6-dihalohexanoic acid or mixtures thereof by using a process as claimed in claim 2 and recovering the 6-halohexanoic acid from the aqueous layer obtained after the halo-6-hydroxyhexanolactone has been extracted with an inert solvent.

5. A process for the production of 6-hydroxyhexanolactones (6-hydroxycaprolactones) having a single halogen atom in one of the positions 3 and 4 by treating at −10 to +50° C. 3,6-dihalohexanoic acid, 4,6-dihalohexanoic acid or mixtures thereof with an aqueous alkaline solution, adjusting the pH value of the mixture to 1 to 4, heating the acid mixture to a temperature of from 70 to 150° C. and isolating the halohexanolactone.

6. A process for the separation of a mixture containing a 6-monohalohexanoic acid in addition to a 4,6- or 3,6-dihalohexanoic acid or mixtures thereof by using a process as claimed in claim 5, extracting the lactone with an inert solvent for the lactone and recovering the 6-halocaproic acid from the aqueous solution.

(References on following page)

References Cited

UNITED STATES PATENTS

| | | | |
|---|---|---|---|
| 2,530,348 | 11/1950 | Britton et al. | 260—343.6 |
| 3,056,802 | 10/1962 | Phillips et al. | 260—343 |
| 3,301,825 | 1/1967 | Hostettler et al. | 260—343 |

FOREIGN PATENTS 528,127   7/1956   Canada.

OTHER REFERENCES

Theilheimer: Sny. Meth. of Org. Chem. (Karger, New York, 1952), vol. 6, p. 205, item 569.

Houben-Weyl: Meth. of Org. Chem. (Georg Thieme Verlag, Stuttgart, 1963), Sauerstoff Verbindungen I, Teil 2, pp. 591, 596, 597.

Fieser et al.: Adv. Org. Chem. (Reinhold, New York, 1961), p. 373.

Zaugg: Organic Reactions, vol. 8, "B-Lactones," ch. 7, pp. 306–9.

NORMA S. MILESTONE, *Primary Examiner.*

C. M. SHURKO, *Assistant Examiner.*

U.S. Cl. X.R.

260—539, 534, 239.3, 78.3